United States Patent Office 2,978,026
Patented Apr. 4, 1961

2,978,026
WELL WASH FLUID

Edwin G. Bemis, San Rafael, Calif., assignor to California Research Corporation, San Francisco, Calif., a corporation of Delaware No Drawing. Filed Jan. 7, 1958, Ser. No. 707,480

7 Claims. (Cl. 166—44)

The present invention relates to improvements in oil well production and pertains more particularly to methods and well wash fluids for removing mud, silts and other debris which accumulate, especially in perforated casings (and liners) and gravel packs behind perforated casings, and which interfere with the production of oil from a well.

While many wash fluids have been produced for use in removing plugging materials in oil wells, none have been consistently successful for various reasons. Through numerous tests in wells, I have devised a superior well wash fluid and method of use thereof to remove mud, silts, emulsions of oil, water and muds and other debris which clog oil well perforated casings and gravel packs behind such casings and which thereby plug off producing intervals in oil wells, interfering with the natural flow of oil from the reservoir into the well.

The method and the well wash fluid used in the present invention is based upon fresh water which heretofore has been considered harmful to oil producing formations since it tends to swell clays and the like materials in the formations and/or of causing water block by interfacial tension effects.

The well wash fluid of the present invention consists essentially of fresh water containing 0.25–20%, preferably 1 to 5%, by weight of acetic acid (or other lower aliphatic acid having up to 6 carbon atoms and yielding in water a relatively weak acid solution like acetic acid) and 0.1 to 5%, preferably up to 2%, of a water soluble oxyethylated polypropylene oxide product in which the polypropylene oxide portion has a molecular weight of 1,000 to 2,000 and the oxyethylene portion is 20 to 80% by weight of the product.

This well wash fluid has been found to be highly effective in loosening and breaking up partially hardened or dried-out plugging materials and of separating and liquefying so-called "gunks and clabbers," muds, silts, emulsions of oil, water and muds and other debris. In several instances, the present well wash treatment has given substantial increases in oil production where prior exceptionally thorough light oil circulation washes or other stimulation treatments failed to increase production. Such improved oil production is obtained by treating with the present well wash fluid which does not cause swelling of materials such as clays in the producing formations, or water block by interfacial tension effects. The water-soluble oxyethylated polypropylene oxide product in the aqueous weak acid water solution is surprisingly effective in dispersing mud silts and providing a cleaning action to remove clogging materials from the casing perforations or the gravel pack between the perforated casing and the oil producing formation or other material immediately outside the perforated casing. The oxyethylated polypropylene oxide product is unusual in that it is not adversely affected in its detergency for clayey plugging materials in relatively low pH (i.e., 4–6) solution. Most detergents in acid solution are ineffective to disperse mud silts and to provide a cleaning action. Dispersing activity in acid solution is to be distinguished from mere stability in acid solution. The superior detergency or suspending property of the present well wash fluid consisting of fresh water containing acetic acid and the oxyethylated polypropylene oxide product, as compared to aqueous acetic solutions containing other detergents, can be shown by the following beaker test: a 5 gram aliquot portion of an oil formation silt (composed of a very fine-grained clay, oil, tarry residue and a very small amount of an acid-soluble material) is stirred into 100 cc. of fresh water containing about 3% of acetic acid and about 1% of the detergent. When the detergent is the 45% oxyethylated polypropylene oxide product of about 3,000 molecular weight, as hereinafter described, is used, the silt remains suspended for some time. However, when an alkylphenyl ether of polyethylene glycol (wherein the alkyl group is a hydrocarbon chain averaging about 12 carbon atoms derived from propylene polymer and wherein the material has an average of about 12 ethylene glycol units), the silt settles out rapidly. Other detergents generally give the same poor results.

The oxyethylated polypropylene oxide product of the present invention does not cause swelling of clays, whereas many detergents do. The acidic character of the well wash fluid further inhibits the tendency of fresh water to swell clays and also brings about a shrinking of previously swelled clays. In addition, the acid, though not so strong as to reduce the dispersing action of the oxyethylated polypropylene oxide product, acts to dissolve carbonaceous scales and carbonaceous binder in deposits which plug the perforations of the casing and the gravel pack. Further, the preferred acetic acid does not sludge most crude oils.

In preparing the well wash fluid, acetic acid is preferred as indicated above, but other lower aliphatic acids such as the fatty acids, formic acid, propionic acid, butyric acid and the like can be used. The oxyethylated polypropylene oxide is obtained by treating polypropylene oxide, i.e., polypropylene glycol with ethylene oxide under condensing conditions so that the oxyethylene portion forms 20–80% of resulting condensation product. Thus, for example, a polyoxypropylene base of 1550 average molecular weight is condensed with sufficient ethylene oxide to give a product in which the oxyethylene portion constitutes about 45% of the product. This product is an oily liquid with a specific gravity (25/25° C.) of about 1.045, a viscosity (at 25° C.) of about 650 centipoises, a pour point of 21° C., a molecular weight of about 3000, and a pH of about 7 in a 2.5% solution at 25° C. Another condensation product with the same polyoxypropylene base gives an oxyethylated product with a molecular weight of about 2000 and the oxyethylene portion constituting about 25° of the product. This product is an oily liquid with a specific gravity (at 25/25° C.) of about 1.03, a viscosity (at 25° C.) of about 400 cps. and a pour point of about −11° C. Another condensation product prepared from a polyoxypropylene base of about 1050 average molecular weight and in which the oxyethylene portion constituted about 45% of the oxyethylated product was an oily liquid with a specific gravity (at 25/25° C.) of about 1.055, a molecular weight of about 2000, a viscosity (at 25° C.) of about 575 and a pour point of about 12° C.

Ordinarily the well wash fluid contains the lower amount such as 0.5% of the acetic acid. Higher percentages of acid in the well wash fluid are used in those wells where carbonate scale formation or carbonaceous binder is known or is expected to exist. Further, the higher percentages of the oxyethylated polypropylene oxide product is used in those wells where a heavy clay drilling fluid cake is known or suspected to exist.

In preparing for the well treatment, a concentrated aqueous mixture of the acetic acid (or other suitable weak acid) and oxyethylated polypropylene oxide product is conveniently brought to the well head for mixing with fresh water to the desired proportions for introduction into the well. The concentrate preferably is a 50–85% aqueous acid solution containing 5–25% of the oxyethylated polypropylene oxide product. The concentrate can be prepared under appropriate protective conditions for handling glacial acetic acid and then delivered to the well head for admixing with fresh water, thereby avoiding the hazards of handling glacial acetic acid at the well. For example, an aqueous concentrate containing 50% acetic acid and 12.5% oxyethylated polypropylene oxide can be diluted with fresh water to yield a well wash fluid containing 1% acetic acid and 0.5% of the oxyethylated product.

In applying the well wash fluid technique, the above-described well wash fluid is introduced into the well and brought into contact with the clogging debris in the perforations of the casing and preferably also in the gravel pack between the perforated casing and the producing formation. To promote contact of the well wash fluid with the clogging debris, the wash fluid is vigorously agitated or surged with a wash mandrel, after it is placed in the well adjacent the plugged section of the perforated casing and/or gravel pack. The fluid can be "spotted" (i.e., placing an amount of wash fluid adjacent the section of perforated casing to be treated) and holding the fluid in such position until the acid at least partially reacts (so called "pickling") or the fluid may be first displaced out through the casing perforations and gravel pack partly into the formation. While the treatment is particularly effective in plugged wells completion with a perforated casing and a gravel pack between the casing and producing formation (so-called "gravel pack completion"), it can also give improved production in other types of well completion such as slotted pipe and gun or jet perforations where plugging has occurred. (The term "perforated casing" is used throughout in its generic sense to include perforated liners, slotted liners, liner screens, and the like. Also, "gravel packs" include liners prepacked with gravel as well as gravel flowed into place behind perforated casings with a fluid; i.e., "flow-pack completion." The "gravel" includes sand and other fine particles placed in the well to serve as a retaining support to control loose formation sand.)

Especially effective to remove clogging material from gravel packs between the liner and producing formation and also from perforations in casings is the following preferred procedure: A well washing tool on a run-in string (of tubing or drill pipe) is placed in the well with the washing ports between the packer cup or swab rubbers opposite a portion of the oil producing interval. With the aid of such tool or the like the wash fluid is circulated out between the packer rubbers through restricted section of the perforated casing, up behind the casing through the gravel pack or other material immediately outside the casing and back through upper perforations into the annulus about the run-in string and thence to the surface of the well where the debris is removed before recirculating the wash fluid. The packer cups on the wash tool are closely spaced, such as 6″–2′ apart, so that the wash fluid is ejected at a high pressure and velocity out through a restricted section of the perforated casing.

Where formation pressures are sufficient to permit filling the hole, the fluid is circulated down the run-in string and returned to the surface through the annulus between the run-in string and the casing. The inlet pressure of the circulating fluid at the surface is then maintained at no greater than about 400 p.s.i.g. pressure by regulating the volume of circulation which initially may be negligible. While this pressure is held constant, the tool at the bottom of the hole is reciprocated up and down over an interval generally corresponding to the distance between collars of the perforated casing. Reciprocation of the tool is continued, and during normal breakdown (i.e. removal) of plugging debris the volume of liquids circulated is gradually increased until maximum practicable volumes permitted by the surface equipment are being circulated through the wash tool. Usually the maximum circulation rate will be up to about 300 barrels/hour. The surface pressure is then reduced to zero and the wash tool is moved down to the next perforated casing joint (i.e., section of casing between joints) where the process is repeated. Washing is usually preferably started at the top of the perforated interval and continued until the bottom perforated joint has been washed. Full circulation through the tool is then continued for a period of about one hour to wash contaminated fluids from the well bore.

Often all or some of the wash fluid is lost to the formation during the circulating process. Effective cleaning of the well bore has been accomplished by introducing the wash fluid and reciprocating the wash tool as described above, even though wash fluid returns to the surface are small or nil.

After completion of the wash fluid treatment, it is sometimes desirable to exhaust the wash fluid from the well by circulating it out with a clean oil. Conventional bailing operations may also be used to clean out the well upon completion of the wash fluid treatment.

Where the wash fluid treatment is carried out by "spotting" the wash fluid in contact with the producing interval to be treated, usually about 200 barrels of well wash fluid are used for each 100 feet of producing interval.

Various suitable well washing tools are available for use in connection with the method; for example, there may be used the "M & T Circulating Washer" of the McGaffey-Taylor Corporation, as described at page 3370–1 of volume 2 of the "Composite Catalog of Oil Field and Pipeline Equipment," 19th edition (published by World Oil, the Gulf Publishing Company), or the "Yowell Push Out Perforation Washer" of the Yowell Service Company as described at pages 5321–2 of the above-mentioned composite catalog. In addition, other tools involving different agitation techniques such as the McGaffey-Taylor and Yowell pressure and suction washers may be used with the fluid.

The well wash fluid is also useful in improving cleaning of perforated casings with gas. Thus, where gas (such as air or other light gas, e.g., methane, field gas, etc.) is circulated down a well bore and out through a perforated casing and gravel pack with the aid of a wash tool and back to the surface, as described above for the injection of well wash fluid, an improvement in the cleaning action can be obtained by introducing into the gas stream at the surface a small amount of the well wash fluid of the present invention. The amount of the well wash fluid can be from about 50–500 barrels for each 1–2 million cubic feet of gas injected. This addition of well wash fluid to the gas stream is particularly effective in helping to open up severely plugged perforated casings and gravel packs. Also, this addition minimizes the "fluffing" (i.e., conversion to a viscous emulsion) of heavy crudes below 20 gravity which sometimes occurs with untreated gas circulation. Such "fluffed" heavy crudes often become so viscous as to plug the tubing.

When using gas modified with the well wash fluid, the spacing between the packer cups of the wash tool is increased to allow enough gas to circulate in order to provide enough gas volume, i.e., flow rate to lift the fluids out of the hole up through the annulus between the run-in string of tubing and the unperforated portion of the casing. Sometimes a two-feet spacing is sufficient but usually a spacing of 5–15 feet between the packer cups is more efficient.

The use of gas to circulate the well wash fluid is sometimes particularly advantageous in that it makes it possible to circulate with very low pressures opposite the formation. Thus, the well could be washed with a pressure less than formation pressure. Then, most of the loosened plugging material can be circulated out of the well and the natural flow of the reservoir fluids into the well, while circulating, will assist the cleaning action.

Also, the well wash fluid sometimes can be advantageously added, as indicated above, to the gas, when drilling with gas as the circulating fluid, particularly when encountering formations which produce liquids such as water or crude oil in such limited amounts as to form with the drill cuttings a sticky mass which tends to adhere to the walls of the drill string and borehole and casing.

Another variation of the well wash treatment is desirable when the oil-producing formation near the well bore shows indications of, or is expected to have, blocking with carbonaceous or calcareous deposits and/or with water held by interfacial tension effects. In such instances, the oil-producing formation is advantageously pretreated with an anhydrous oil solution of acetic acid (or other similar weak aliphatic acid), preferably containing also oil-soluble alkylated phenol polyethylene glycol ethers which contain 3-25 glycol units, at least 8 carbon atoms in alkyl substituents in the phenol ring and a ratio of alkyl carbon atoms to glycol units ranging from one and one-third to four. A typical suitable ether is obtained by first alkylating phenol with a propylene polymer having an average of 14 carbon atoms in the polymer chain and then condensing the alkyl phenol with an average of 5.5 ethylene glycol units. A highly aromatic liquid such as benzene, toluene or mixtures as may be obtained by extraction of kerosene fractions with liquid sulfur dioxide, is the preferred oil, particularly when using the preferred combination of both the acid and alkylated phenol polyethylene glycol ether. When treating with a non-acidic solution of the ether, the oil is preferably an aliphatic oil such as kerosene or diesel fuel. Usually the oil solution contains 0.5 to 2% or up to 5% of the foregoing ethers, as set forth in copending application Serial No. 573,318, now U.S. Patent No. 2,874,779. The concentration of organic acid will vary from a lower limit, depending on the desired reaction with calcareous deposits, up to an upper limit determined by solubility, for example, a concentration of 36 pounds of glacial acetic acid appears to be the maximum amount which is soluble in one barrel of diesel fuel oil. A further description of treatment with acid-in-oil solutions is given in copending application Serial No. 383,931, now U.S. Patent No. 2,910,436. Usually about ½ to 3 barrels of the treating oil solution is injected per foot of formation.

After the pretreatment described above, the perforated casing and/or gravel pack is advantageously treated with the aqueous well wash fluid as set forth above.

The well wash fluid and the methods of use are further illustrated in the following examples:

*Example 1*

A wash fluid concentrate is prepared by admixing 20 barrels of fresh water with about 1680 pounds of glacial acetic acid and about 336 pounds of the above-described oxyethylated polypropylene oxide product wherein the oxyethylene portion constitutes about 45% of the product and the polyoxypropylene base has an average molecular weight of about 1550 and the molecular weight of the product is about 3000. This concentrate contains about 25% of acetic acid and 5% of the oxyethylated polypropylene oxide product.

*Example 2*

At the well head, the concentrate of Example 1 is diluted with sufficient additional fresh water to make 1000 barrels of well wash fluid, which as indicated above is ordinarily sufficient to treat 500 feet of producing interval. The wash fluid so formed contains 0.5% acetic acid and 0.1% of the oxyethylated polypropylene oxide product.

*Example 3*

1000 barrels of the wash fluid containing 1.0% acetic acid and 0.1% of the oxyethylated polypropylene oxide of Example 1 was used as a circulation wash to treat well A which was completed with slotted liners opposite two producing intervals of 113 and 117 feet, respectively. The wash was accomplished by pumping the fluid down through a run-in string of tubing and out between a pair of wash tool swab cup rubbers spaced six inches apart and through the liner perforations. In this case, there were no returns of wash fluid to the surface, and hence the surface pressure was relatively low, i.e., 50-100 pounds. The wash tool carrying the swab cup rubbers was moved up and down between the collars of the perforated casing joint in stages opposite the producing intervals, while gradually increasing the pumping rate. The 30-day average production before treatment was 10 b./d. (barrels per day), whereas after treatment the first 30-day average production was 17 b./d. and the 60-day average was 20 b./d.

*Example 4*

Well B having a 30-day average production of 14 b./d. before treatment and having 508 feet of producing interval completed with a liner perforated and gravel prepacked opposite the producing intervals was treated with 400 barrels of the well wash fluid of Example 2 (containing 1.5% acetic acid and 0.2% of the oxyethylated polypropylene oxide product). The wash fluid was pumped down through the run-in string and out between the wash tool rubbers and through the liner perforations and upwards behind the liner through the gravel pack and back through the liner perforations above the top wash tool rubber and hence up through the annulus inside the casing to the surface, where the debris was removed and the wash fluid recirculated. The surface pressure on the wash fluid was kept relatively constant at about 400 p.s.i.g. During the circulation, the wash tool was reciprocated as in Example 3 and the circulation rate was increased to about 300 barrels per hour. The treatment resulted in 30-day and 60-day average productions of 48 b./d. and 58 b./d., respectively.

*Example 5*

A treatment with 400 barrels of the well wash fluid of Example 4 and in the same manner in well C having a 30-day average production of 7 b./d. before treatment and 292 feet of producing intervals completed with a liner perforated and gravel prepacked opposite the producing intervals resulted in 30-day and 60-day average productions of 21 b./d. and 22 b./d., respectively.

*Example 6*

1500 barrels of fresh water containing 0.5% acetic acid and 0.1% of the oxyethylate polypropylene oxide of Example 1 was used to treat well D having a liner perforated for 1461 feet and being gravel flow packed behind the liner. The wash was introduced through a wash tool as in Example 3, no wash fluid returns being obtained. After the wash treatment the accumulated debris in the hole was removed by bailing. The 30-day average production was 37 b./d. of crude oil before treatment and the 60-day average after treatment was 47 b./d.

*Example 7*

Well E having a liner perforated over a 110 ft. interval was treated by introducing down inside the casing 250 barrels of fresh water containing 0.5% acetic acid and 0.1% of the oxyethylated propylene oxide product of Example 1. A casing scraper was then run and the well allowed to stand overnight. Then a perforation scraping tool with expanding knives (i.e., a knife perforation cleaner) and a swab tool were run into the liner and the liner swabbed for 8 hours. Thereafter, the 130 ft. of accumulated debris in the hole was removed by bailing. The 30-day average production before treatment was 10 b./d. and the 60-day average after treatment was 38 b./d.

*Example 8*

Well F was treated in a manner similar to Example 4 above. This well had producing intervals of 72 ft., 37 ft., and 154 ft. and was completed with gravel prepacked liner. The 30-day average production before treatment was 10 b./d. and the 60-day average after treatment was 35 b./d.

*Example 9*

Well H was found to have a severely plugged prepack gravel liner and methane was circulated down a tubing string and out from between the packer rubbers of a wash tool. With gas alone no cleaning action could be detected and the low gravity (13° Bé.) formation oil was badly "fluffed" by the dry gas. The "fluffed" oil was so viscous that it plugged the tubing. Then a wash fluid consisting of fresh water containing 0.5% acetic acid and 0.1% of the oxyethylated polypropylene oxide product of Example 1 was pumped into the gas stream at the surface and circulated back out of the hole with the gas. The packer rubbers on the wash tool were spaced about 10 ft. apart to allow sufficient volume of gas to lift the fluids and debris out of the hole in the annulus between the tubing and casing. The addition of the wash fluid released the plugging material so that rates of 2000 m.c.f./d. of gas could be circulated. At this gas circulation rate with 150 b./d. of the wash fluid added to the gas, definite breakdown of the plugging material in the liner was observed. While circulating, the wash tool was reciprocated over a 30 ft. stroke for about 30 minutes. All fluids were circulated from the well. Gas and fluid returns were passed through a gas trap, where fair amounts of mud and sand were recovered.

The foregoing examples are illustrative and other variations and modifications of the wash fluid and methods can be made within the scope of the appended claims.

I claim:

1. A well wash fluid capable of removing clogging debris from casing perforations and gravel packs, said fluid consisting essentially of fresh water containing 0.25 to 10% of an aliphatic acid of no more than six carbon atoms and 0.1 to 5% of a water-soluble oxyethylated polypropylene oxide product in which the polypropylene oxide portion has a molecular weight of 1,000 to 2,000 and the oxyethylene portion is 20 to 80% of said product, said percentages being by weight.

2. A well wash fluid capable of removing clogging debris from casing perforations and gravel packs, said fluid consisting essentially of fresh water containing 1 to 5% of acetic acid and 0.1 to 2% of a water-soluble oxyethylated polypropylene oxide product in which the polypropylene oxide portion has a molecular weight of 1,000 to 2,000 and the oxyethylene portion is 20 to 80% of said product, said percentages being by weight.

3. A concentrate, capable of ready dilution with fresh water to form a well wash fluid containing 0.25–10% of an aliphatic acid of no more than 6 carbon atoms and 0.1 to 5% of a water-soluble oxyethylated polypropylene oxide product in which the polypropylene oxide portion has a molecular weight of 1000 to 2000 and the oxyethylene portion is 20–80% of the product, said concentrate consisting essentially of 50–80% of said acid, 5–25% of said oxyethylated polypropylene oxide product and the remainder fresh water, said percentages being by weight.

4. A method of improving the production of oil through a perforated casing and gravel pack from a producing zone penetrated by a well bore, said method comprising the steps of injecting into a restricted portion of said perforated casing opposite a producing zone a well wash fluid consisting essentially of fresh water containing 1 to 5% of acetic acid and 0.1 to 2% of a water-soluble oxyethylated polypropylene oxide product in which the polypropylene oxide portion has a molecular weight of 1,000 to 2,000 and the oxyethylene portion is 20 to 80% of said product and, while continuing the injection, changing the position of said restricted portion alternately up and down over a distance of at least 10 feet but not extending substantially beyond joints in the casing and the producing interval, whichever is the lesser distance, said percentages being by weight.

5. The method of claim 4 wherein the point of ejection of said well wash fluid through a restricted portion of said perforated casing is started adjacent the top of the producing interval and is moved down progressively in stages to cover each portion of said producing interval until the maximum fluid circulation rate through the perforated casing is obtained.

6. The method of improving the production of oil through a perforated casing and gravel pack which have become at least partially clogged, said method comprising the steps in sequence of freeing the bore of the perforated casing of accumulations of debris, placing within the perforated casing opposite an oil producing interval a vertically spaced pair of packer cups on tubing extending to the well head and having an opening in the tubing between said packer cups, introducing into the tubing and forcing out through said opening between said packer cups through the casing perforations isolated by said packer cups a well wash fluid consisting essentially of relatively fresh water containing 1 to 5% of acetic acid and 0.1 to 2% of an oxyethylated polypropylene oxide product in which the polypropylene oxide portion has a molecular weight of 1,000 to 2,000 and the oxyethylene portion is 20 to 80% of the product, and vertically reciprocating the tubing while the well wash fluid is being ejected from the opening between the said packer cups and thence through restricted portions of the perforated casing adjacent the producing interval, the amplitude of said reciprocation not extending substantially beyond said producing interval, said percentages being by weight.

7. In a method of improving the production of oil through a perforated casing and gravel pack from a producing zone penetrated by a well bore, wherein a gas is injected through a restricted portion of said perforated casing opposite a producing zone and said gas passes back through the perforated casing above said restricted zone and thence to the well surface, the improvement comprising injecting into said gas streams being injected through the restricted portion of the perforated casing a well wash fluid consisting essentially of fresh water containing 1 to 5% of acetic acid and 0.1 to 2% of a water-soluble oxyethylated polypropylene oxide product in which the polypropylene oxide portion has a molecular weight of 1,000 to 2,000 and the oxyethylene portion is 20 to 80% of said product, said percentages being by weight.

References Cited in the file of this patent

UNITED STATES PATENTS

| | | |
|---|---|---|
| 1,984,668 | Weir et al. | Dec. 18, 1934 |
| 2,213,987 | Layne | Sept. 10, 1940 |
| 2,512,801 | Kinney et al. | July 27, 1950 |
| 2,602,778 | Snyder | July 8, 1952 |
| 2,717,876 | Menaul | Sept. 13, 1955 |
| 2,839,466 | Shock et al. | June 17, 1958 |

OTHER REFERENCES

Beeson: Well Completion Practices, Article in World Oil, January 1950, pages 88 and 89.

Toxicity and Irritation Data on the Pluronics, publication by Wyandotte Chemicals Corporation of Wyandotte, Michigan, August 1952, pages 1, 3, and 4.